March 21, 1933.   B. E. THOEN   1,901,998
AGITATOR
Filed Aug. 7, 1931   2 Sheets-Sheet 1

Benett E. Thoen
INVENTOR
PER Ivan D. Tifft
ATTORNEY

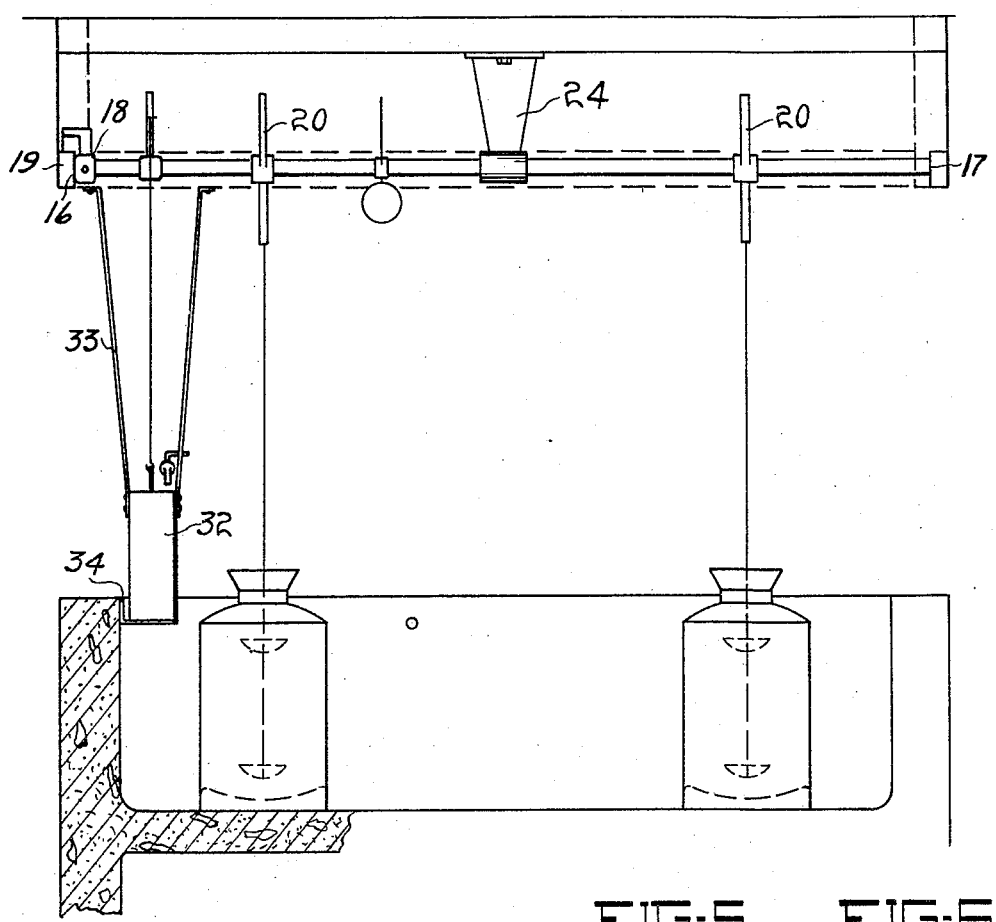
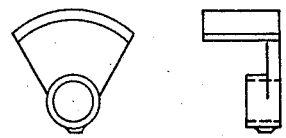
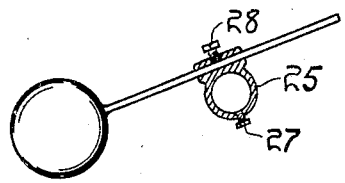

Patented Mar. 21, 1933

1,901,998

UNITED STATES PATENT OFFICE

BENNETT E. THOEN, OF ORFORDVILLE, WISCONSIN, ASSIGNOR, BY MESNE ASSIGNMENTS, OF ONE-HALF TO ORRIN B. OVESTRUD, OF ORFORDVILLE, WISCONSIN

AGITATOR

Application filed August 7, 1931. Serial No. 555,697.

My invention relates to agitating devices for use in accelerating the cooling of milk or other fluids. The primary object of the device is to provide a simple and inexpensive means for rapidly cooling milk on farms where the only mechanical power available is water from a tap. Another object of my device is to provide a simplified structure which may be easily assembled and positioned in the average farm milk-house.

It is common knowledge that the germ content of milk will increase rapidly if it is not cooled immediately after milking so that when the said milk is tested at the milk plant, or at that point where the farmer delivers his milk, it will many times be rejected. Thus it is essential that milk be cooled directly after the milking, and on most farms this is an exceedingly tedious operation.

All dairy farms are provided with a milk-house having in it a water trough which is supplied with cold water by a windmill or other mechanical means. Immediately after the milking, the cans of milk are deposited in the trough and the milk content is manually agitated as to cause it to cool thoroughly. To manually agitate six or eight cans of milk is a tedious and a long drawn out process, but by using my device the average dairy farmer can, with the power he possesses (which, on the average farm, is water) quickly and mechanically thoroughly cool milk.

In order that my invention may be thoroughly understood, reference should be had to the accompanying drawings in which Fig. 1 is a view partially in plan and partially in section of my agitating device installed in a milk-house.

Fig. 3 is a view partially in plan and partially in section of the side elevation of the device.

Fig. 4 is a view partially in plan and partially in section of the compensating weight employed in conjunction with my apparatus.

Fig. 5 is a plan view of a stop employed on one end of the drive shaft which determines the limit of rotation of said drive shaft.

Fig. 6 is a plan view of the side elevation of said stop.

Figure 1:
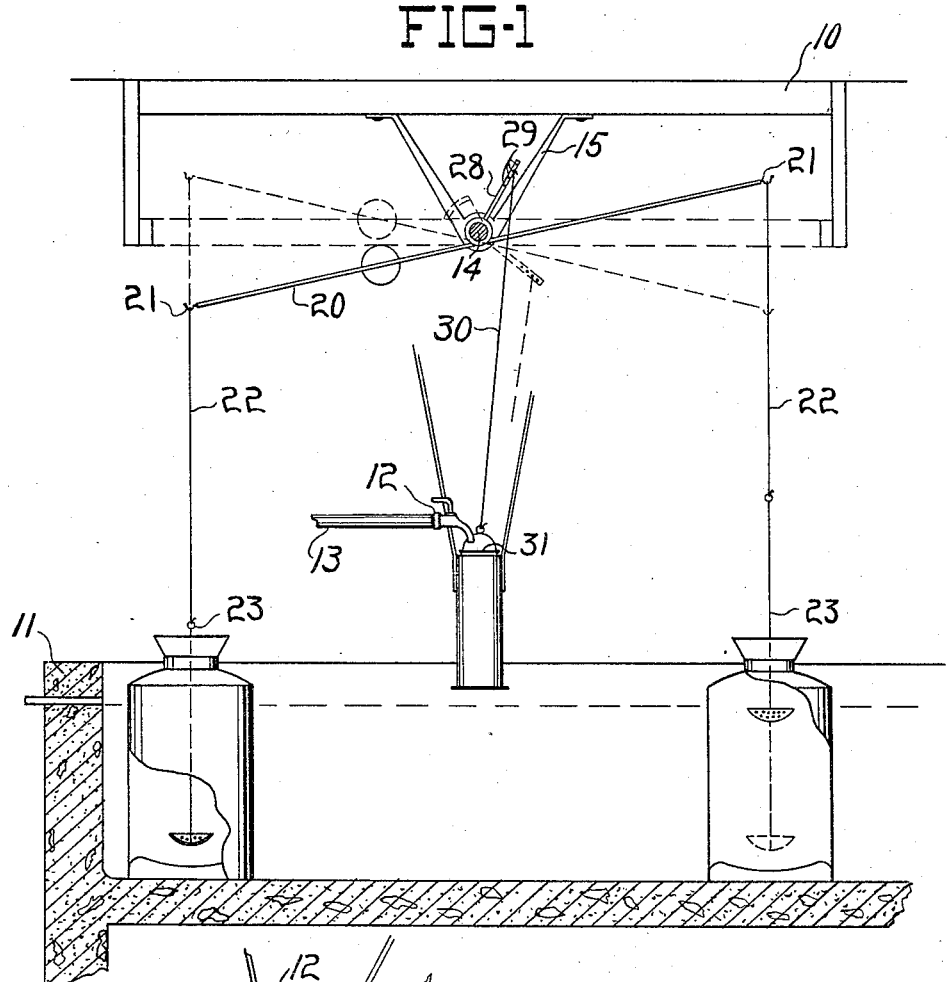

In the drawings, the numeral 10 generally indicates the supporting frame of my device, which frame is adapted to be affixed to the top of the milk-house directly over a water trough 11 which is supplied with water through the medium of tap 12.

A pipe 13 interconnects the said tap with a wind-mill pump or tank supplied by said wind-mill pump or other mechanical pumping means.

Suspended from and within the frame 10 directly over and running longitudinally of the trough 11 is a shaft 14, said shaft being fixed through the medium of braces 15 and being fulcrumed in the frame 10 at 16 and 17 in a manner as to permit rotation of said shaft. Fixed to said shaft is a stop 18, the extending flange of which is adapted to contact the bracing member 19 of the frame 10 as to limit the rotation of said shaft.

Laterally extending arms 20 are also positioned on the said shaft, the extensions being an equal distance from said shaft on opposite sides as to balance.

Hooks 21 are formed integral with said extension to which are adapted to be attached rods 22, the extremities of which are curved as to form attaching hooks which engage hooks on the extending arms 21 and rings formed on the outer extremities of agitating members 23, the agitating members being dish-shaped and the extending handle being fixed in the center of the concave portion thereof.

It is obvious that as many of the arms 20 may be provided as is necessary.

A centrally located bracing member 24 is provided for the shaft 14, and consists merely of a conventional shaft brace.

The compensating weight 25 is affixed to the shaft 14 through the medium of a locking bolt 27, the said weight being adjustable from and to said shaft, the adjustment being fixed by the lock nut 28. The function of this compensating weight will be explained hereafter.

A laterally extending actuating arm 28 is fixed to the shaft 14, said arm being perforated as at 29 to receive the hook end of actuating rod 30, the opposite end of said rod being adapted to be hooked to a bucket 31.

A sleeve 32 is positioned directly under the actuating arm 28 by means of metal straps 33 which are, in turn, fixed to the underside of the frame 10. In some instances it is advisable also to fix the sleeve 32 to the side of the cement trough through the medium of strap 34, a combination of straps 33 and 34 lending stability to the said sleeve.

Figure 2:
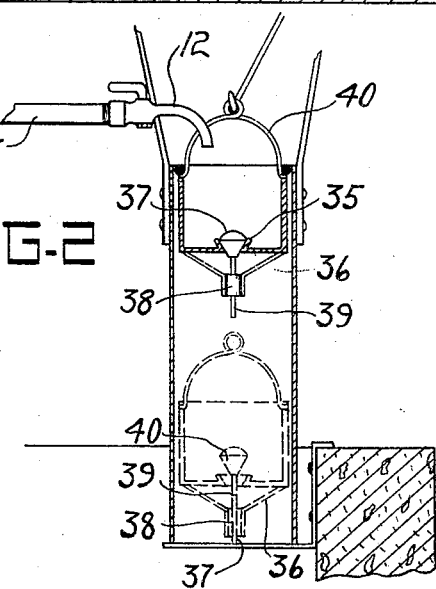
Fig. 2 is a view partially in plan and partially in section of the power portion of the said agitating device.

A bucket 31, which is specifically shown in Fig. 2, is apertured at the bottom, the edge of the aperture being turned upwardly and outwardly to form a valve seat 35. Fixed to the bottom of said bucket is a metal strap 36 having an aperture 37 in the center thereof in alignment with the aperture in the bottom of the bucket. Force-fitted in the aperture 37 is a metal guide sleeve 38 into which a valve member is adapted to reciprocate. The said valve member consists of a stem 39 to the upper end of which is fixed a hollow cone-shaped rubber valve 40, which valve is adapted to normally seat in the bottom of the bucket. The lower end of the stem 39 extends through the sleeve 38 a sufficient distance as to permit its contact with the cross member on the bottom of the sleeve 32 when the bucket is lowered within said sleeve.

Fixed to the top edge of the bucket is a handle 40 which is provided with a loop to take the hook on the lower end of the actuating rod 30. The said bucket, and the sleeve 32 in which it rides, are positioned directly below the orifice in the tap 12 so that when the tap 12 is turned on, the water will flow directly into the bucket.

The operation of the device is as follows:

The cans of warm milk are placed in the trough, each can being directly below the ends of the arms 20. The agitators are hooked onto the rods 22 and are inserted into the opening in the can. The water is then turned on at the tap 12 and the bucket within the sleeve begins to fill.

Inasmuch as the specific gravity of valve 37 is sufficient to hold the valve in a closed position, water will remain in the said bucket and the weight of said water will eventually pull the arm 29 downwardly, revolve the shaft 14, actuate the arms 20 and thus cause the agitators in the cans to be moved up and down. Immediately the can, due to the weight of the therein, reaches the bottom of the sleeve 32, the guide cylinder 39 contacts an extension across the bottom of sleeve 34 and forces the valve 37 off its seat 35, thus permitting the water to drain from the bucket into the trough whereupon the compensating weight, which is so adjusted as to cause the shaft to be rocked in the opposite direction, exerts its force and the shaft 14 will be rotated in the opposite direction than that caused by the actuation of the arm 28 through the medium of the bucket 31 when the said bucket is filled with water.

Inasmuch as the compensating weight causes the shaft to be rotated in a clock-wise direction which causes the arm 28 to raise the can within the sleeve 32 and inasmuch as the valve will immediately seat upon the can being raised, the said can will begin to fill with water and by the time it has reached the top of the sleeve, the weight of the water will be such as to offset the weight of the compensating arm, and the can will descend again.

Inasmuch as the said movement is successive, the agitators on the ends of the arm 20 will be raised and lowered in succession on either side of the drive shaft 14. The speed of operation may be increased or decreased by positioning the actuating rod 30 in different holes in the actuating arm 28 and adjusting the compensating weight accordingly. To increase the speed the adjustment should be away from the shaft and to decrease the speed the adjustment should be towards said shaft.

Having described my device, what I desire to secure by Letters Patent is:

A fluid actuating device comprising in combination a portable frame adapted to be secured to the ceiling of a building over a trough; a shaft rotatably mounted in said frame and extending longitudinally thereof over said trough; arms extending from said shaft; an agitator fixed to the end of said arms and adapted to extend into fluid containers; an actuating rod extending from one of said arms; a compensating weight on the opposite side of the shaft from said actuating rod; a bucket on the end of said actuating rod and vertically extending guides for said bucket; a valve in the bottom of said bucket, said valve being actuating at the lower-most position of said bucket in said guides to empty accumulated water in said bucket, and means whereby the filling and emptying of said bucket will cause the said shaft to rotate in a clockwise and anti-clockwise direction successively thus causing the agitators to be raised and lowered in the container.

BENNETT E. THOEN.